United States Patent [19]

Röhm

[11] Patent Number: 4,991,859
[45] Date of Patent: Feb. 12, 1991

[54] SELF-TIGHTENING DRILL CHUCK

[76] Inventor: Günter H. Röhm, Heinrich-Röhm-Strasse 50, D-7927 Sontheim, Fed. Rep. of Germany

[21] Appl. No.: 510,037

[22] Filed: Apr. 16, 1990

[30] Foreign Application Priority Data

Jun. 20, 1989 [DE] Fed. Rep. of Germany ....... 3920075

[51] Int. Cl.$^5$ ............................................. B23B 31/12
[52] U.S. Cl. ........................................ 279/60; 408/240
[58] Field of Search ...................... 279/60, 61, 62, 63, 279/64; 408/240

[56] References Cited

U.S. PATENT DOCUMENTS

| 4,272,087 | 6/1981 | Röhm | 279/62 |
| 4,274,642 | 6/1981 | Wünsch | 279/62 |
| 4,607,855 | 8/1986 | Röhm | 279/62 |
| 4,880,246 | 11/1989 | Röhm | 279/60 X |

Primary Examiner—Z. R. Bilinsky
Attorney, Agent, or Firm—Robert Dubno; Andrew Wilford

[57] ABSTRACT

A self-tightening drill chuck has a chuck body adapted to be mounted on a drill spindle for rotation about an axis and a tightening sleeve surrounding the body and formed with a substantially frustoconical seat centered on the axis and having a front end turned away from the chuck body and formed with a plurality of radially inwardly open, angularly offset, and axially extending grooves. The sleeve is secured on the chuck body for rotation about the axis thereon but against axial movement thereon. A jaw guide in the sleeve formed with a plurality of axially forwardly open and angularly spaced slots has a front end formed with respective radially outwardly projecting ridges engaged in the grooves. Respective jaws are axially and radially displaceable in the slots and on the seat.

8 Claims, 3 Drawing Sheets

SELF-TIGHTENING DRILL CHUCK

FIELD OF THE INVENTION

The present invention relates to a self-tightening drill chuck. More particularly this invention concerns such a chuck that is normally used in a power drill.

BACKGROUND OF THE INVENTION

A standard self-tightening drill chuck normally has a chuck body adapted to be mounted on a drill spindle for rotation about an axis and formed with substantially cylindrical front and a rear outer surfaces both centered on the axis and axially offset from each other and with an outwardly open groove between the front and rear surfaces. A tightening sleeve surrounding the body is formed with substantially cylindrical front and rear inner surfaces both centered on the axis and riding on the front and rear surfaces of the body and with an inwardly open groove between the front and rear inner surfaces and forming with the groove of the body an annular generally circular-section passage. The cylindrical surfaces keep the sleeve and chuck body centered on each other. The front part of this sleeve, which is typically made of several pieces, is formed with a rearwardly flared substantially frustoconical seat also centered on the axis. Rollers riding in the grooves support the sleeve on the body so as to permit relative rotation of the body and sleeve about the axis while preventing relative axial displacement. A jaw guide in the sleeve is formed with a plurality of axially forwardly open and angularly spaced slots in which respective jaws that also ride on the seat are axially and radially displaceable.

These objects are attained according to my earlier U.S. Pat. No. 4,880,246 in a self-tightening drill chuck of the abovedescribed general type but having a spring unit braced axially between the guide and the chuck body and urging the guide axially forward to press the jaws axially forward against the seat. Thus with the system of this earlier invention the sleeve forming the jaw seat as well as the inner and outer cylindrical guide surfaces can be formed in the same turning operation, that is by the same lathe in the same production step, so all these surfaces will be absolutely perfectly coaxial. The sleeve will ride perfectly on center on the chuck body, which is similarly turned in one operation so its outer cylindrical guide surfaces are also perfectly coaxial, and the jaws will ride on the perfectly coaxial frustoconical jaw seat. The jaw guide therefore serves basically to keep the jaws angularly offset in the desired position, and itself is kept tightly in place on the jaw seat by the spring unit.

In this arrangement the guide and sleeve are formed with radially confronting pockets in which is received a locking ball that rotationally couples the sleeve and guide. One of the pockets is formed as an axially elongated slot so that there is some possibility of limited axial movement between the sleeve and guide. These pockets are formed at the rear end of the chuck, that is its end remote from the tool where torque is applied to the chuck so that some twisting and deformation of the chuck is possible. As a result the guide can get wedged in the sleeve and become canted and offcenter relative to the chuck body. Hence the self-tightening action will be at least partially lost.

OBJECTS OF THE INVENTION

It is therefore an object of the present invention to provide an improved self-tightening chuck.

Another object is the provision of such an improved self-tightening chuck which overcomes the above-given disadvantages, that is which stays centered even when stressed considerably.

SUMMARY OF THE INVENTION

A self-tightening drill chuck according to this invention has a chuck body adapted to be mounted on a drill spindle for rotation about an axis and a tightening sleeve surrounding the body and formed with a substantially frustoconical seat centered on the axis and having a front end turned away from the chuck body and formed with a plurality of radially inwardly open, angularly offset, and axially extending grooves. The sleeve is secured on the chuck body for rotation about the axis thereon but against axial movement thereon. A jaw guide in the sleeve formed with a plurality of axially forwardly open and angularly spaced slots has a front end formed with respective radially outwardly projecting ridges engaged in the grooves. Respective jaws are axially and radially displaceable in the slots and on the seat.

Thus with this arrangement each of the segmental front parts of the jaw guide is angularly coupled to the sleeve, ensuring excellent torque transmission between the jaws and the chuck body. The force is transmitted just where it is applied so that it will not tend to twist or cant the guide in the sleeve. The guide will remain perfectly centered in he sleeve so that there will be nothing interfering with the self-tightening action.

According to this invention at least one such ridge and the respective groove is provided immediately adjacent each jaw. More particularly each groove is axially elongated and the ridges are axially slidable in the grooves and two such grooves and the respective ridges symmetrically flank each jaw and the jaws are angularly equispaced about the axis. Furthermore there are three such jaws and the grooves and the respective ridges are angularly equispaced abut the axis.

The frustoconical seat according to the invention has a front edge and the grooves are formed at this front edge. The sleeve is formed between the grooves with an outer cylindrical surface and the jaw guide is formed between the ridges with a complementary inner cylindrical surface engaging the outer surface of the sleeve.

DESCRIPTION OF THE DRAWING

The above and other objects, features, and advantages will become more readily apparent from the following, reference being made to the accompanying drawing in which.

SPECIFIC DESCRIPTION

Figure 2:
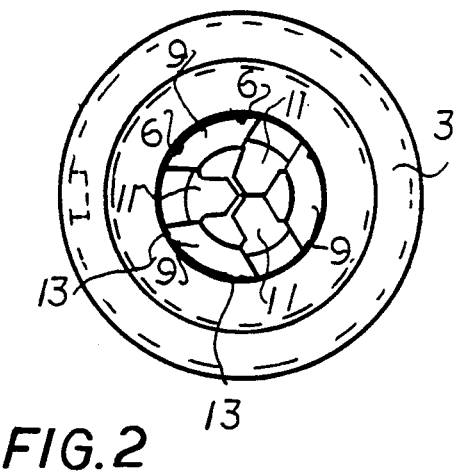
FIG. 2 is a bottom view of the chuck.
Figure 1:
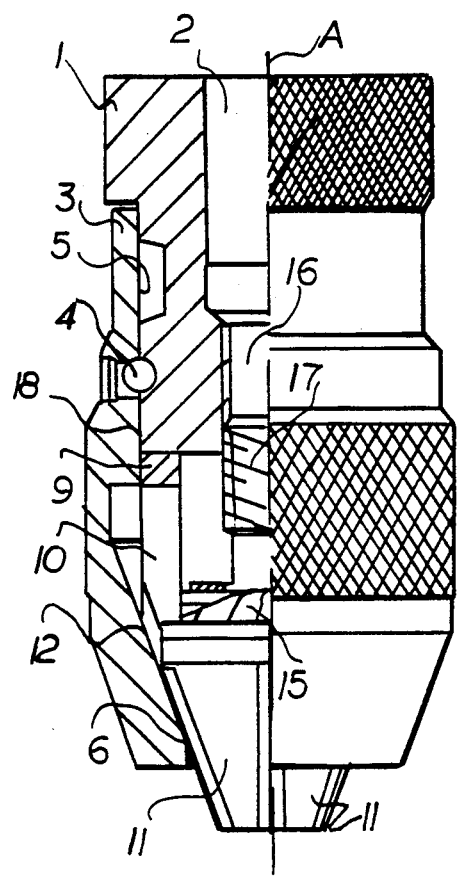
FIG. 1 is a side view partly in axial section through the chuck according to this invention.

As seen in FIG. 1 a chuck according to the invention has a chuck body 1 centered on an axis A and formed with a rearwardly open threaded bore 2 into which fits the spindle of a drill that rotates this body 1 about the axis A. A tightening sleeve 3 is fitted over this body 1, and the body 1 and sleeve 3 are formed with confronting radially open grooves in which ride balls 4 that serve to axially couple these two parts together while still permitting the sleeve 3 to rotate freely on the body 1. To this end the body 1 is formed to both sides of the coupling-ball groove with a cylindrical outer surface 15 on which rides a complementary but axially longer cylindrical inner surface 5 of the sleeve 3.

A jaw guide 9, formed of steel like the body 1 and sleeve 3, is received inside the sleeve 3 axially forward of the body 1 and is formed with three angularly equispaced and axially forwardly open guide slots 10 receiving respective jaws 11. The sleeve 3 is formed at its front end with a frustoconical guide surface 12 and the jaws 11 slide in the slots 10 and on this surface 12. The jaw guide 9 itself has at its rear end a cylindrical surface that rides on the cylindrical inner surface 15 of the sleeve 3 and a frustoconical outer front face 7 (FIG. 3) that rides on the seat surface 12. The guide 9 can normally move axially limitedly between rearward engagement with the front face of the body 1 and forward engagement with the surface 12.

An actuator element 15 has a front face formed with radial grooves receiving the rear ends of the jaws 11 and a rear end constituted as a threaded stem 17 received in a threaded bore 16 formed in the chuck body 1. Rotation of the element 15 in one direction in the body 1 will push the jaws 11 axially forward and radially together, and opposite rotation will move them back and out.

Figure 4:
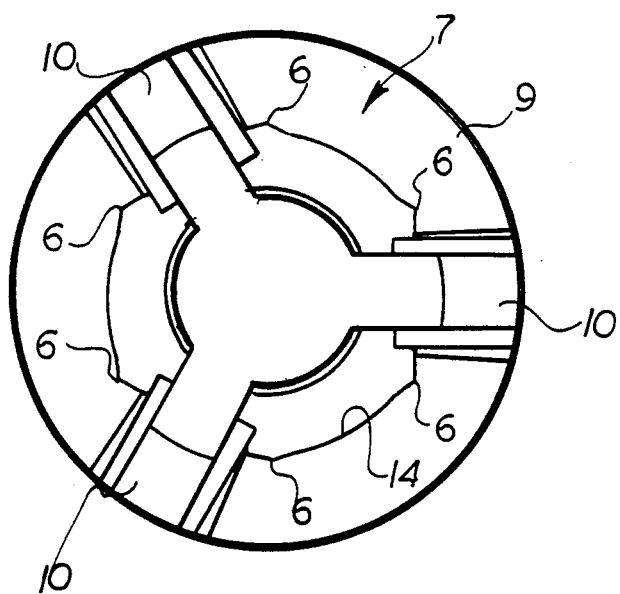
FIG. 4 is a bottom view of the jaw guide.
Figure 3:
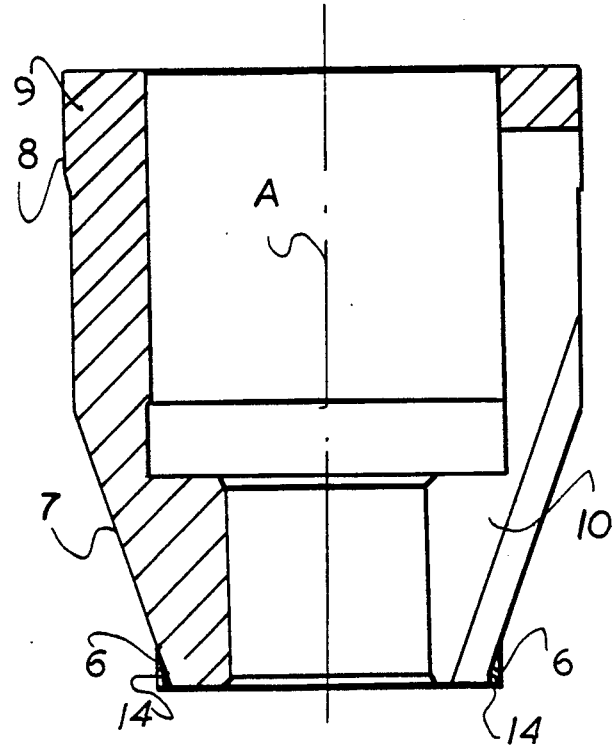
FIG. 3 is an axial section through the jaw guide of the chuck.

In accordance with this invention the jaw guide 9 as seen in FIGS. 3 and 4 is formed at its front end, that is its end turned away from the body 1 and normally closest to the workpiece being drilled, with six angularly equispaced, triangular-section ridges 6 that extend axially and that are separated by a cylindrical land 14 centered on the axis A. The ridges 6 symmetrically flank the respective jaw slots 10 and lie on the points of a regular hexagon centered on the axis A.

Figure 6:
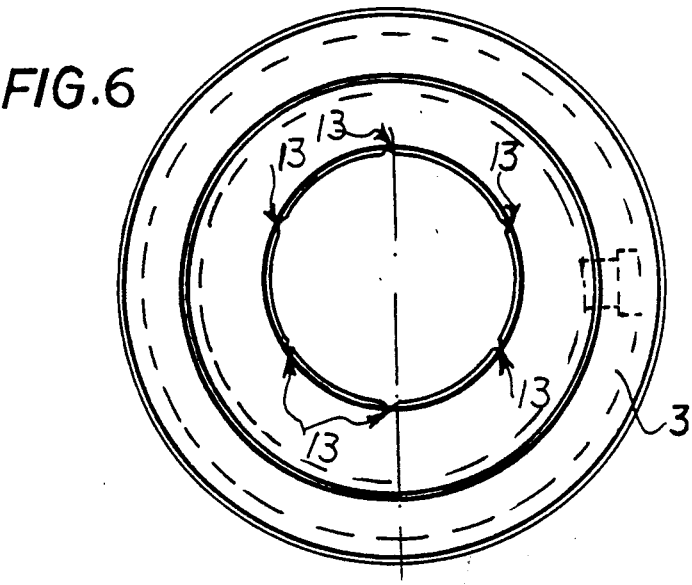
FIG. 6 is a bottom view of the tightening sleeve.
Figure 5:
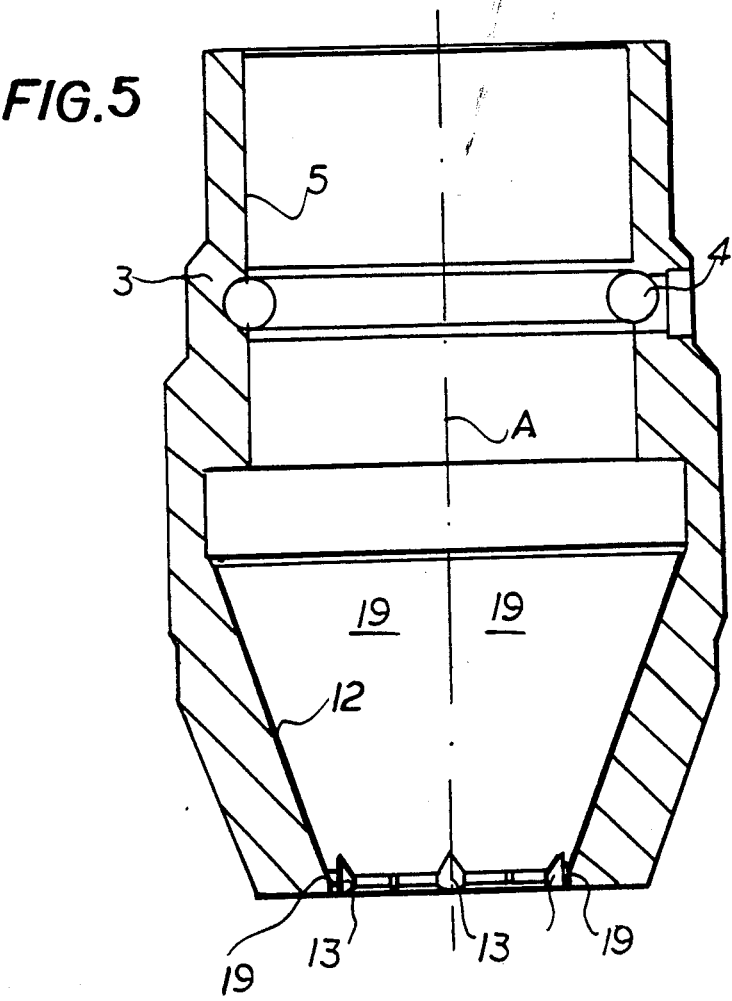
FIG. 5 is an axial section through the tightening sleeve of the chuck.

As seen in FIGS. 5 and 6 the sleeve 3 is formed at its extreme front end with six angularly equispaced, triangular-section grooves 13 complementary to and fitting over the ridges 6 and elongated axially like these ridges 6. Between these grooves 13 the sleeve has a cylindrical surface 19 complementary with and normally riding on the surface 14.

Thus the interfit of the ridges 6 in the grooves 13 will rotationally couple the jaw guide 9 to the sleeve 3. Such coupling takes place at the extreme front end of the chuck so that there is no possibility of the jaw guide 9 canting and getting jammed in the sleeve 3. The self-tightening action will be sure to work at all times when the drill is used.

I claim:

1. A self-tightening drill chuck comprising:
    a chuck body adapted to be mounted on a drill spindle for rotation about an axis;
    a tightening sleeve surrounding the body, formed with a substantially frustoconical seat centered on the axis, and having a front end turned away from the chuck body and formed with a plurality of radially inwardly open, angularly offset, and axially extending grooves;
    means securing the sleeve on the chuck body for rotation about the axis thereon but against axial movement thereon;
    a jaw guide in the sleeve formed with a plurality of axially forwardly open and angularly spaced slots and having a front end formed with respective radially outwardly projecting ridges engaged in the grooves; and
    respective jaws axially and radially displaceable in the slots and on the seat.

2. The self-tightening drill chuck defined in claim 1 wherein at least one such ridge and the respective groove is provided immediately adjacent each jaw.

3. The self-tightening drill chuck defined in claim 1 wherein each groove is axially elongated and the ridges are axially slidable in the grooves.

4. The self-tightening drill chuck defined in claim 1 wherein two such grooves and the respective ridges symmetrically flank each jaw and the jaws are angularly equispaced about the axis.

5. The self-tightening drill chuck defined in claim 4 wherein there are three such jaws.

6. The self-tightening drill chuck defined in claim 4 wherein the grooves and the respective ridges are angularly equispaced abut the axis.

7. The self-tightening drill chuck defined in claim 1 wherein the frustoconical seat has a front edge and the grooves are formed at this front edge, the sleeve being formed between the grooves with an outer cylindrical surface, the jaw guide being formed between the ridges with a complementary inner cylindrical surface engaging the outer surface of the sleeve.

8. A self-tightening drill chuck comprising:
    a chuck body adapted to be mounted on a drill spindle for rotation about an axis and formed with a radially outwardly open coupling ball track;
    a tightening sleeve surrounding the body, formed with a substantially frustoconical seat centered on the axis and with a radially inwardly open ball track facing the track of the body, and having a front end turned away from the chuck body and formed with six radially inwardly open, angularly equispaced, and axially extending grooves;
    a plurality of balls riding in the tracks and thereby securing the sleeve on the chuck body for rotation about the axis thereon but against axial movement thereon;
    a jaw guide in the sleeve formed with three axially forwardly open and angularly equispaced slots and having a front end formed with respective radially outwardly projecting ridges engaged in the grooves; and
    respective jaws axially and radially displaceable in the slots and on the seat.

* * * * *